United States Patent [19]

Pleska et al.

[11] Patent Number: 4,689,813
[45] Date of Patent: Aug. 25, 1987

[54] SPEAKERPHONE TELEPHONE ANSWERING MACHINE

[75] Inventors: John C. Pleska, Downey; Gerald L. Mock, Corona, both of Calif.

[73] Assignee: Fortel, Inc., Compton, Calif.

[21] Appl. No.: 670,611

[22] Filed: Nov. 13, 1984

[51] Int. Cl.⁴ .............................................. H04M 1/65
[52] U.S. Cl. ...................... 379/80; 379/70; 379/79
[58] Field of Search ............ 179/6.03, 6.13–6.16, 179/100 L

[56] References Cited

U.S. PATENT DOCUMENTS

| | | | |
|---|---|---|---|
| 4,346,261 | 8/1982 | Hestad et al. ................... | 179/100 L |
| 4,496,797 | 1/1985 | Price ................................ | 179/6.15 |
| 4,499,335 | 2/1985 | Lyle ................................. | 179/6.03 |
| 4,525,603 | 6/1985 | Bond ................................ | 179/6.16 |
| 4,539,436 | 9/1985 | Theis ............................... | 179/6.03 |
| 4,558,179 | 12/1985 | Bond ................................ | 179/6.03 |

*Primary Examiner*—Raymond F. Cardillo
*Assistant Examiner*—James E. Tomassini
*Attorney, Agent, or Firm*—Keith D. Beecher

[57] ABSTRACT

A telephone answering machine which includes a speakerphone feature to enable the user to converse directly with a calling party through the machine. A microphone and a speaker are included in the machine together with interconnecting circuitry which may be activated by the user upon the receipt of a telephone call to enable the user to communicate with the calling party through the machine instead of having the calling party record his message on the machine in response to a recorded announcement.

3 Claims, 3 Drawing Figures

SPEAKERPHONE TELEPHONE ANSWERING MACHINE

BACKGROUND OF THE INVENTION

The speakerphone system of the invention enables the user to answer his telephone and converse with a calling party when his telephone answering machine is activated. This is a convenience since it enables the user to maintain his telephone answering machine active even when he is present, and it permits him at will to take calls or to let the telephone answering machine receive calls. To take a call, the user operates a switch on the telephone answering machine upon the receipt of a call, and communicates with the caller through a microphone and speaker within the machine. Muting circuitry is provided to prevent feedback between the microphone and the speaker. Accordingly, only one party can speak at any one time.

DETAILED DESCRIPTION OF THE ILLUSTRATED EMBODIMENT

Figure 1:
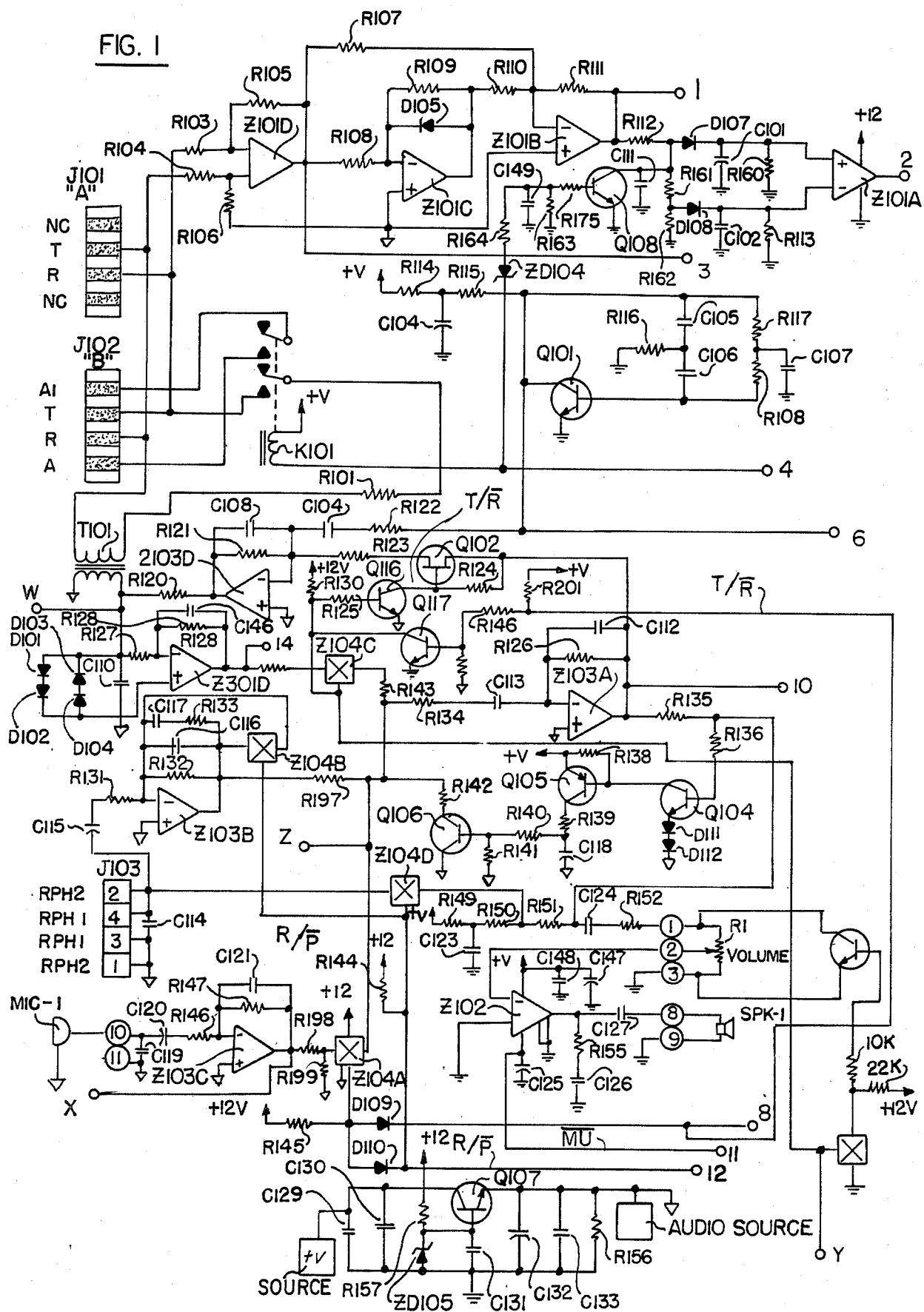
FIGS. 1 and 2 together represent a schematic circuit diagram of a telephone answering machine including the speakerphone feature of the invention.
Figure 2:
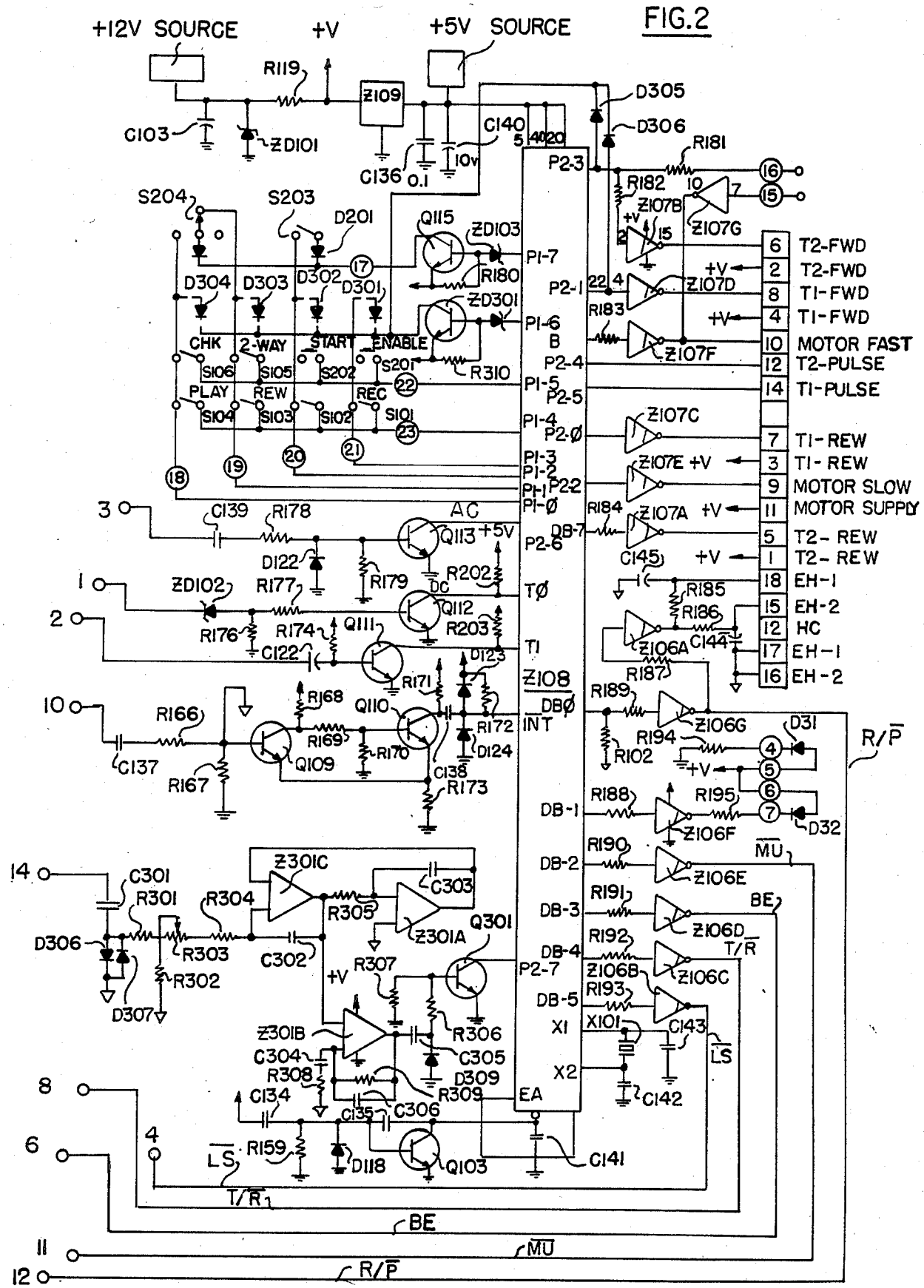

The telephone answering machine shown in FIGS. 1 and 2 includes a microcomputer Z108 which may be of the type manufactured and sold by the National Semi-Conductor Company, and which is designated by them as INS 8048. The machine also includes a connector J101 which has terminals T and R connected to the tip and ring terminals of the telephone line.

Line seizure is effectuated by a relay K101. The system is coupled to the telephone line through a transformer T101. The outgoing audio signals corresponding to the recorded announcement and which are transmitted over the telephone line to a caller during the announcement interval ($T_1$), upon the receipt of a ring signal, are amplified by an amplifier Z103D. The incoming audio signals from the caller received over the telephone and which are recorded during the message interval ($T_2$) are amplified by amplifier Z301D and Z103A. A connector J103 is connected to the record and reproduce head RPH2 associated with the T-2 message magnetic tape of the machine, and to the record and reproduce head RPH1 associated with the T-1 announcement magnetic tape.

The incoming audio signals from the telephone line representing a message from a caller to be recorded on the T-2 tape are passed through transformer T101 and through an operational amplifier Z301D and through a bilateral analog switch Z104C to amplifier Z103A, and through a bilateral analog switch Z104D to the record/reproduce head RPH2 to be recorded on the message tape T-2. Resistors R149, R150 and R151, together with grounded capacitor C123 provide a bias circuit for the head. An automatic gain control circuit for amplifier Z103A is provided by transistor Q104, Q105 and Q106. The audio signals representing the announcement recorded on the announcement tape T-1 are amplified by amplifier Z103B, and are then passed through amplifier Z103A and amplifier Z103D to transformer T101 for application to the telephone line.

The ring signal for the telephone answering system is initiated when a ring signal occurs at the tip (T) and ring (R) terminals of connector J101. The ring signal is fed to operational amplifier Z101D. The alternating current signal output of amplifier Z101D is fed to port P2-6 of microcomputer Z108, by way of a differentiator circuit formed by capacitor C139, resistor R178, diode D122, resistor R179 and transistor Q113.

The microcomputer Z108 decides whether or not the alternating current output of amplifier Z101D is of proper duration (>400 milliseconds) and amplitude (>20 VRMS) and if so activates the T-1 announcement tape when the ring signal count matches the count set by the ring select switch S203. Ring select switch S203 can be set to cause the system to respond to a selected number of rings before activation, according to the setting of the switch.

When the microcomputer Z108 recognizes the preset ring count, it initiates the T-1 cycle. The T-1 cycle activates the T-1 announcement tape, causes the machine to go off hook, and plays the announcement recorded on the announcement tape over the telephone line to the caller. For this purpose, microcomputer Z108 activates port P2-2 which turns on a motor (M1) at its regulated speed (motor slow) by way of driver Z107E, and terminal J105-9. Port P2-1 of the microcomputer is turned on at this time to activate the T-1 forward solenoid. This action in conjunction with the activation of motor M1 pulls in the T-1 head plate and starts the T-1 tape moving. At the same time, port DB-5 of the microcomputer Z108 goes high (1), and its output is fed to an inverting amplifier driver Z106B, which output $\overline{LS}$ is at ground potential. This activates relay K101 which puts transformer T101 and resistor R101 across the tip and ring terminals of strip J102, providing a line seize (off-hook) condition. Port DB-4 of the microcomputer is low (0) at this time, and its output is inverted by inverter Z106C providing high (1) potential at its output ($T/\overline{R}$). This potential is fed to the base of transistor Q117 to render the transistor conductive. When transistor Q117 is conductive, it causes the bilateral analog switch Z104C to be opened.

Audio signals corresponding to the audio announcement recorded on the moving T-1 tape are picked up by record head RP-1 and fed by way of capacitor C115 and resistor R113 to amplifier Z103B. The audio signals are amplified by a gain of approximately 200, and fed to amplifier Z103A by way of resistors R197 and R134, and capacitor C113. The audio signals are amplified in amplifier Z103A by a gain of approximately 100, and is fed to field effect transistor (FET) Q102 which is biased to its conductive state by resistor R124. So long as transistor Q116 is non-conductive, the announcement audio signals are passed through FET Q102 to amplifier Z103D, from which they are fed to the line transformer T101. The line transformer transmits the outgoing audio announcement signals to the telephone line.

The audio output from Z103A is also fed to a Schmitt trigger formed of transistors Q109 and Q110 by way of capacitor C137 and resistor R166. The squared audio signal from the collector of Q110 is fed to a differentiator circuit formed by capacitor C138 and resistor R172. The resulting negative-going spikes are interrogated by microcomputer Z108 by way of port $\overline{INT}$ to detect a beep tone (1530 Hz–2070 Hz) which is recorded on the T-1 announcement tape, and which signals the end of the T-1 announcement. When the beep tone recorded on the T-1 tape is recognized, the microcomputer turns off port P2-1 which releases the T-1 forward solenoid. This action causes the T-1 head plate to retract, and stops the T-1 tape.

The message recording cycle (T2) begins when the beep tone on the announcement tape (T-1) is recognized by the microcomputer Z108 at port "INT". When the message recording cycle (T₂) begins, the message tape T-2 is activated to permit the recording of the message received from the calling party over the telephone line for the length of the time specified by the setting of the message time switch S204. When the switch S204 is in the "fix" position, the message received over the telephone line may be recorded up to a fixed interval of time, after which the machine will automatically shut off. When the switch S204 is in the "VOX" position, the message received over the telephone line will continue to be recorded on the message tape T-2 for so long as the calling party continues to talk, up to the capabilities of the message tape. Specifically, the machine will continue to record the message until there is a 7 second break in the audio signal, or a dial tone is encountered, or a busy signal is encountered, or a pulse due to the calling party hanging up occurs.

The VOX interrogation of the incoming audio signal is controlled by the microcomputer Z108. The external circuitry necessary for this function is the Schmitt trigger formed by transistors Q109 and Q110 which digitizes the audio information. Once the microcomputer has determined that no audio is present, or that a spurious audio signal is present, the microcomputer will then cause the message tape T-2 to rewind an amount corresponding to the 7 second time-out, and it then outputs the beep tone to the tape heads by energizing a beep signal oscillator associated with transistor Q101. Then the T-2 tape will be disengaged. The system will then transfer to the T-1 announcement tape, and rewind the T-1 announcement tape to its origin position, and await the next call.

When the beep tone recorded on the T-1 announcement tape is recognized by the microcomputer Z108, it sets the port P2-1 low (0) which disengages the T-1 forward solenoid. The motor (M1) remains on by way of port P2-2. Port P2-3 is then made high (1), and its output, after inversion by inverter Z107B energizes the T-2 play solenoid. This action, in conjunction with the activation of motor M1 engages the T-2 head plate causing the T-2 message tape to move in the forward direction. The system now enters its T₂ cycle, during which port DB-5 remains high (1) maintaining line seizure, and port DB-4 goes high.

The audio signals from the telephone line may now be fed into the system to be recorded on the T-2 tape, because the microcomputer Z108 has caused port DB-4 to go high (1), the output from port DB-4 being inverted by inverter Z106C causing its output T/$\overline{R}$ to go low (0). When T/$\overline{R}$ goes low, switch Z104A is turned off deactivating the microphone MIC; switch Q102 is turned off; transistor Q117 becomes nonconductive to allow voltage from resistor R130 to turn on analog switch Z104C. When switch Z104C is turned on, it permits the audio signal from the telephone line to be passed to amplifier Z103A by way of transformer T101, R127, R129, Z301D, Z104C, R143, R134 and C113. Amplifier Z103A feeds audio signals to the heads RPH2 of the T-2 message tape by way of resistors R135 and R151, analog switch Z104D and connector J103-2. Resistors R149 and R150, and capacitor C123 provide a DC bias to the record head. Analog switch Z104D is turned on at this time by the microcomputer Z108 causing port DB-0 to go low (0), and output R/$\overline{P}$ to go high (1) so that audio may be applied to the T-2 heads RPH2. The amplifier Z103B is disabled at this time, because analog switch Z104B is also turned on. Port DB-0 goes high only when the T-1 or T-2 tapes are being rewound.

At the end of the T₂ message recording interval, port P2-3 goes low releasing the T-2 head plate. Port P2-0 will then go high (1) activating the announcement T-1 rewind solenoid. This causes the announcement tape T-1 to rewind to its origin position. When that position is reached, no more T1 pulses are received at port P2-5 and the microcomputer terminates the rewind operation and sets the system in condition to receive the next call.

Should the owner wish to retrieve his message from a remote telephone, he sends a remote control signal over the telephone line which is coded in accordance with a predetermined code.

When the remote control is received by the system of FIG. 1, it is fed to amplifier Z301D by way of resistor R127 and transformer T101. Z301D feeds the remote control signal to a narrow bandpass filter consisting of amplifiers Z301C, Z301A and Z301B. The frequency of the remote control signal is adjusted by potentiometer R303. The output of amplifier Z301B is fed to the microcomputer port P2-7 by way of capacitor C305, resistor R306 and transistor Q301.

Once the remote control signal is sampled and its frequency is determined by the microcomputer Z108, it is compared to a diode matrix code created by the removal or insertion of diodes D301 through D304. If its code matches the diode matrix code, the microcomputer will set P2-3 low (0) which causes the T-2 tape to stop, if it has not already stopped due to being full.

If there are messages on the T-2 tape, the microcomputer will activate port DB-7 high (1) causing the T-2 rewind solenoid to be energized to activate the rewind mechanism and rewind the T-2 tape back, either to its beginning position, or to a position that is stored in the microcomputer memory at the point at which the system was last remoted. When the T-2 tape has been rewound, port P2-3 is set high (1) to activate the T-2 forward solenoid and start the T-2 tape moving in its forward direction. Port DB-4 is now set low, causing switches Z104C and Z104D to open and switch Q102 to close. Audio information is now fed from the T-2 record/reproduce head (RPH2) through J103 to preamplifier Z103B, and then to Z103A by way of resistor R197, resistor R134 and capacitor C113. Amplifier Z103A feeds the audio information from the T-2 tape to the phone line by way of transistor switch Q102, R123, amplifier Z103D, R120 and T101. The messages recorded on the T-2 tape are then transmitted to the calling party over the telephone line.

After all of the messages recorded in the T-2 tape have been transmitted over the telephone line to the caller, the T-2 tape will stop. This is achieved by feeding pulses into port P2-4 from a T-2 pulse switch whenever the message tape is moving. The microcomputer counts these pulses and stores them in memory. When the pulses fed from J105-13 into port P2-4 match the number that are set in memory, the programming of the microcomputer determines that this signifies the end of all the messages recorded on the T-2 tape and will stop the tape. A long tone is then generated by activating port DB-3 low (0), which turns on the Q101 beep oscillator and causing the resulting beep tone to be fed to the telephone line.

At the termination of the continuous beep tone, port DB-3 is caused to go successively high and low, so that the Q101 beep oscillator will provide a series of beep tones to be transmitted to the calling party over the telephone line.

If all of the messages on the T-2 tape are to be saved, no remote signal is sent over the telephone line by the calling party, and the microcomputer will cause port P2-3 to go low, deactivating the T-2 forward solenoid and causing the T-2 message tape to stop. The microcomputer will then rewind the T-1 announcement tape by causing port P2-0 to go high (1) which turns on the T-1 rewind solenoid. The T-1 solenoid rewinds until the T-1 pulses stop at port P2-5 signifying the beginning of the T1 announcement tape. When the T1 tape reaches its beginning, the system is again ready to answer any calls received over the telephone line.

If the messages on the T-2 tape are not to be saved, the calling party again transmits the remote signal during the period in which the beep signals are transmitted to him, and this signal is fed to port P2-7 and identified. Upon identification of the remote signal, the microcomputer activates port DB-0 low (0) allowing the output of Z106A to go high (1) which turns on the T-2 erase head (EH2). Port P2-3 also goes low (0) releasing the T-2 forward solenoid, and port DB-7 goes high (1) activating the T-2 rewind solenoid. The T-2 tape now rewinds back either to its beginning position, or to the position of the last remote operation, and during rewind, the messages on the T-2 tape are erased because the T-2 erase head (EH2) is activated.

Figure 3:
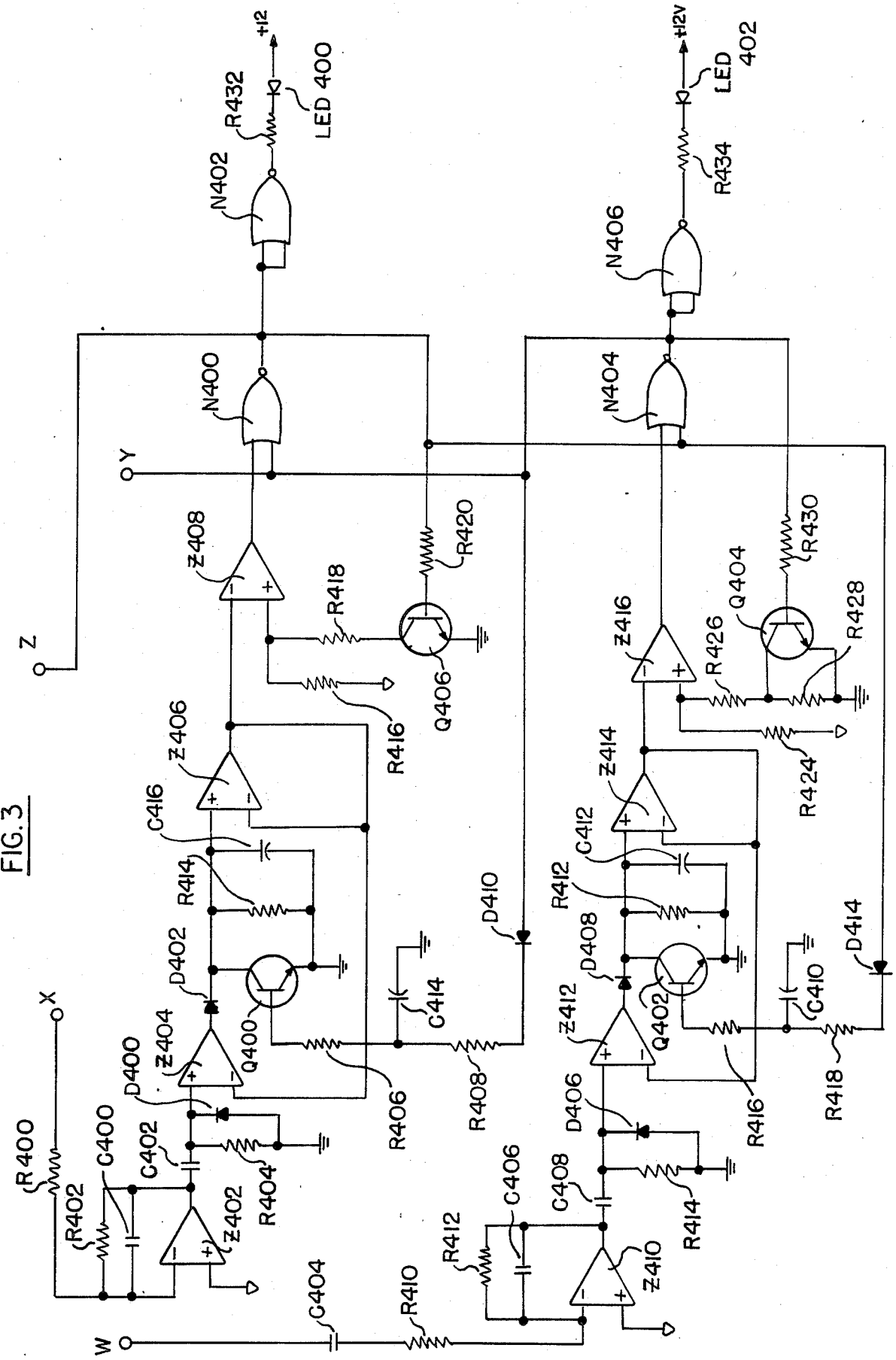
FIG. 3 is a circuit diagram of muting circuitry connected into the circuit of FIG. 1 to enable the machine to perform a speakerphone function.

The muting circuit shown in FIG. 3 is connected into the circuitry of FIG. 1 at the points designated W, X, Y and Z. Point X is connected to the inverting input terminal of an operational amplifier Z402 through a 5.6 kilo-ohm resistor R400. The output of the amplifier is connected back to the input through a 1 megohm resistor R402 which is shunted by a 47 picofarad capacitor C400. The non-inverting input of amplifier Z402 is connected in chassis ground. The output of the amplifier is connected to a 0.01 microfarad coupling capacitor C402 which, in turn is connected to the non-inverting input of an operational amplifier Z404. Capacitor C402 is also connected to a grounded 100 kilo-ohm resistor R404 which is shunted by a diode D400.

The output of amplifier Z404 is connected through a diode D402 to the non-inverting input of an operational amplifier Z406, and the output of amplifier Z406 is connected to the inverting input of an operational amplifier Z408, and to the inverting inputs of operational amplifiers Z404 and Z406. The output of amplifier Z408 is connected to a "nor" gate N400 which in turn is connected to a "nor" gate N402. The output of "nor" gate N402 is connected through a 1.5 kiloohm resistor R432 and through a light emitting diode LED400 to the positive temrinal of a 12-volt source.

The W point is coupled through a 22 microfarad capacitor C404 and through a 5.6 kilo-ohm resistor R410 to the inverting input of an operational amplifier Z410. The output of amplifier Z410 is connected back to the inverting input through a 1 megohm resistor R412 which is shunted by a 47 picofarad capacitor C406. The non-inverting input of amplifier Z410 is connected to the chassis ground.

The output of amplifier Z410 is connected to a 0.01 microfarad capacitor C408 which, in turn, is connected to a non-inverting input of an operational amplifier Z412. Capacitor C408 is also connected to a grounded 100 kilo-ohm resistor R414 which is shunted by a diode D406. The output of amplifier Z412 is connected through a diode D408 to the non-inverting input of an amplifier Z414. The output of amplifier Z414 is connected to the inverting input of an amplifier Z416 and to the inverting inputs of operational amplifiers Z414 and Z412. The output of operational amplifiers Z416 is connected to a "nor" gate N404 which, in turn, is connected through a "nor" gate N406 and through a 1.5 kilo-ohm resistor R434 and light emitting diode LED402 to the positive terminal of the 12-volt source.

The Y point is connected to "nor" gate N400 and to the output of "nor" gate N404 and through a diode D410 and 10 kilo-ohm resistors R408 and R406 to the base electrode of an NPN transistor Q400. The emitter of transistor Q400 is grounded, and the collectors connected to the junction of diode D402 and resistor R414. The output of "nor" gate N404 is connected through a 10 kilo-ohm resistor R430 to the base of a grounded emitter NPN transistor Q404. The collector of transistor Q404 is connected to the junction of a 10 kilo-ohm resistor R426 and a 58 kilo-ohm grounded resistor R428. Resistor R426 is connected to the non-inverting input of amplifier Z4168 and to a 100 kilo-ohm resistor R424 which is connected to chassis ground.

The Z point is connected to the output of "nor" gate N400 and through a 10 kilo-ohm resistor R420 to the base of a grounded emitter transistor Q406. The collector of transistor Q406 is connected to the non-inverting input of amplifier Z408 through a 10 kilo-ohm resistor R418. Resistor R418 is connected to a 100 kilo-ohm resistor R416 which is connected to chassis ground. The Z point is also connected to "nor" gate N404, and through a diode D414 to a 10 kilo-ohm resistor R418. Resistor R418 is connected to a 1 microfarad grounded capacitor C410 and through a 10 kilo-ohm resistor R416 to the base of a grounded emitter NPN transistor Q402. The collector of transistor Q402 is connected to the non-inverting input of amplifier Z414 and to a grounded 270 kilo-ohm resistor R412.

Input audio signals received from the caller are amplified by amplifiers Z410, Z412, Z414 and Z416, and cause the light emitting diode LED402 to glow to indicate to the user that the caller is talking. The amplified signals from amplifier Z416 are applied to transistor Q400 to mute amplifier Z406 when the signals exceed a predetermined amplitude, which effectively mutes the microphone MIC-1. The signals are also applied to "nor" gate N400 to assure that the light emitting diode LED400 is extinguished.

On the other hand, when the user is talking, signals from microphone MIC-1 are applied to amplifier Z402 by way of point Z and these signals are amplified by the amplifiers Z402, Z404, Z406 and Z408 and cause the light emiting diode LED400 to glow, indicating that the user is talking. The output signals of amplifier Z408 are applied to amplifier Z414 effectively to mute the incoming signals from the caller when the output signals exceed a predetermined amplitude, and the output signals are also applied to "nor" gate N404 to assure that light emitting diode LED402 will be extinguished.

In the operation of the system, upon the receipt of a telephone call, the user may operate a selected combination of switches selected, for example, from the switches S101-S106 (FIG. 2) so that when the line is seized after the telephone call, the circuitry of the microphone MIC-1 and speaker SPK-1 is activated, as well as the muting circuit of FIG. 3. Then, the user may communicate directly with the caller by speaking into the microphone MIC-1, and the caller may communicate with the user through speaker SPK-1, with the muting circuitry of FIG. 3 preventing feedback between the speaker and the microphone.

During the speakerphone operation, whenever the caller is talking, the signals applied to port INT of the microcomputer Z108 causes the system automatically to be switched to the receive mode. Then, when the caller stops talking, the system is switched to the transmit mode by signals received by port P2-7. The user may then talk to the caller, and the system will remain in the transmit mode until the caller next talks.

The invention provides, therefore, a convenient speakerphone type of telephone answering machine by which the user may converse directly with the caller through the machine itself.

It will be appreciated that while a particular embodiment of the invention has been shown and described, modifications may be made, and it is intended in the claims to cover the modifications which come within the spirit and scope of the invention.

We claim:

1. In a telephone answering machine which includes a magnetic tape mechanism (T-1) having a recorded announcement thereon to be transmitted over the telephone line to a caller during a time interval ($T_1$) in response to ring signals received over the telephone line, and a magnetic tape mechanism (T-2) for recording messages received over the telephone line during a time interval ($T_2$) following the time interval ($T_1$), the combination of: a microcomputer including first means responsive to ring signals received over the telephone line to set the system to a transmit mode during which the system has the capability of transmitting audio signals over the telephone line; a first input circuit coupled to the telephone line and to the microcomputer for introducing the ring signals to the microcomputer; an output circuit connected to the microcomputer to be coupled to the telephone line and to the (T-1) tape mechanism by the microcomputer during said transmit mode to cause audio signals to be transmitted over the telephone line to a caller representing the annoucement recorded on the (T-1) tape mechanism; said microcomputer including second means responsive to an input signal to set the system to a receive mode during which the system has the capability of processing audio signals received over the telephone line, circuit means connected to said microcomputer for introducing said last-named input signal to said microcomputer at the end of the ($T_1$) time interval; and a second input circuit connected to the microcomputer to be coupled to the telephone line and to the magnetic tape mechanism (T-1) by the microcomputer during said receive mode for receiving audio signals over the telephone line during the (T2) time interval representing a message from the caller and for causing such audio signals to be recorded on the (T-2) tape mechanism; the combination of: a receive circuit including a speaker mounted in said machine; a transmit circuit including a microphone mounted in said machine; a control circuit mounted in said machine and including manually operated switch means connected to said microcomputer for enabling said microcomputer to set the machine to a communication mode during which the operator can communicate directly with the caller over the telephone line; first circuit means connected to said microcomputer for connecting said receive circuit to the telephone line during said communication mode to cause audio signals received over the telephone line to be reproduced by the speaker when the machine is in said receive mode; second circuit means connected to said microcomputer for connecting said transmit circuit to said telephone line during said communication mode to cause audio signals from the microcomputer to be transmitted over the telephone line during said transmit mode; and third circuit means connected said microcomputer to said input circuit to disable said input circuit during said communication mode so as to prevent audio signals received over the telephone line during the communication mode to be recorded on the (T-2) tape mechanism.

2. The combination defined in claim 1, and which includes first muting circuitry connected to said receive circuit for muting said transmit circuit when audio signals are received by said receive circuit during said communication mode, and which includes second muting circuitry connected to said transmit circuit for muting said receive circuit when audio signals from the microphone are transmitted to the telephone line during said communication mode.

3. The combination defind in claim 1, and which includes further circuitry connected to said receive circuit and to said microcomputer for causing said microcomputer to shift said system from the receive mode to the transmit mode during said communication mode when no audio signals are received by said receive circuit.

* * * * *